(12) United States Patent
Takahashi et al.

(10) Patent No.: US 7,159,757 B2
(45) Date of Patent: Jan. 9, 2007

(54) METAL/CERAMIC BONDING ARTICLE AND METHOD FOR PRODUCING SAME

(75) Inventors: Takayuki Takahashi, Nagano (JP); Nobuyoshi Tsukaguchi, Nagano (JP)

(73) Assignee: Dowa Mining Co., Ltd., Tokyo (JP)

( * ) Notice: Subject to any disclaimer, the term of this patent is extended or adjusted under 35 U.S.C. 154(b) by 178 days.

(21) Appl. No.: 10/668,967

(22) Filed: Sep. 23, 2003

(65) Prior Publication Data

US 2004/0060968 A1    Apr. 1, 2004

(30) Foreign Application Priority Data

Sep. 26, 2002 (JP) ............................ P2002-280592
Sep. 26, 2002 (JP) ............................ P2002-280618

(51) Int. Cl.
*B23K 31/02* (2006.01)

(52) U.S. Cl. ................................ 228/122.1; 228/234.1; 228/221

(58) Field of Classification Search ...................... None
See application file for complete search history.

(56) References Cited

U.S. PATENT DOCUMENTS

| | | | |
|---|---|---|---|
| 3,766,634 A * | 10/1973 | Babcock et al. ............ 228/188 |
| 3,795,041 A | 3/1974 | Hennicke et al. | |
| 4,129,243 A | 12/1978 | Cusano et al. | |
| 4,693,409 A * | 9/1987 | Mizunoya et al. ........ 228/122.1 |
| 4,985,097 A | 1/1991 | Matsumura et al. | |
| 5,234,152 A * | 8/1993 | Glaeser ....................... 228/121 |
| 5,586,714 A * | 12/1996 | Curicuta et al. .......... 228/122.1 |
| 6,613,450 B1 * | 9/2003 | Tsukaguchi et al. ......... 428/621 |
| 6,858,151 B1 * | 2/2005 | Tsukaguchi et al. .......... 216/13 |
| 2003/0062399 A1 * | 4/2003 | Kimura et al. ............ 228/122.1 |
| 2005/0098609 A1 * | 5/2005 | Greenhut et al. ........ 228/122.1 |

FOREIGN PATENT DOCUMENTS

| | | |
|---|---|---|
| EP | 1 371 621 | 12/2003 |
| JP | 02-175674 A * | 7/1990 |
| JP | 11-97203 | 4/1999 |
| JP | 11097203 | 4/1999 |

OTHER PUBLICATIONS

Chiang W. L. et al: "Effect of Substrate and Pretreatment on Copper to AlN Direct Bonds" Ceramic Engineering and Science Proceedings, Columbus, US, vol. 12, No. 9/10 (1991), pp. 2105-2114.

* cited by examiner

*Primary Examiner*—Lynne R. Edmondson
(74) *Attorney, Agent, or Firm*—Bachman & LaPointe, P.C.

(57) ABSTRACT

After a metal member of an alloy containing copper and nickel is arranged on at least one side of a ceramic substrate, the metal member and the ceramic substrate are heated in an atmosphere of an inert gas or in vacuo at a temperature between solidus and liquidus lines of the alloy to bond the metal member directly to the ceramic substrate.

10 Claims, 2 Drawing Sheets ly relates to a metal/ceramic bonding article having a ceramic substrate and a metal member bonded to the ceramic substrate, and a method for producing the same. More specifically, the invention relates to a metal/ceramic bonding article wherein a metal member of a copper alloy serving as a resistive element is bonded to a ceramic substrate and which is used for an electronic member for resistance, such as a shunt resistive element, and a method for producing the same.

2. Description of the Prior Art

In conventional electronic members for resistance, such as shunt resistive elements, an alloy plate, such as a manganin alloy plate, which serves as a sheet resistor precisely worked by a press working or the like, is bonded to a ceramic substrate, such as an alumina substrate, by the brazing and soldering using a brazing filler metal, such as a silver solder, which contains an active metal (see, e.g., Japanese Patent Laid-Open No. 11-97203).

On the other hand, as methods for bonding a metal plate directly to a ceramic substrate without the need of any intermediate materials, such as brazing filler metals, there are a so-called eutectic bonding method for heating a metal plate and a ceramic substrate at a temperature between their eutectic point and the melting point of the metal in an atmosphere of an inert gas to produce an eutectic melt between the metal plate and the ceramic substrate to bond the metal plate directly to the ceramic substrate (see, e.g., Japanese Patent Laid-Open No. 52-37914), and a so-called molten metal bonding method for causing a molten metal to contact a ceramic substrate to bond a metal plate directly to the ceramic substrate (see, e.g., Japanese Patent Laid-Open No. 7-193358).

However, in the brazing and soldering which uses a brazing filler metal containing an active metal, it is required to use a noble metal, such as silver, as the active metal, so that there is a problem in that production costs are increased. In addition, there are some cases where the brazing and soldering are not preferably used for preparing electronic members for resistors, since resistance varies due to the alloying of the alloy metal with the brazing filler metal. Moreover, if an alloy plate of a copper-nickel alloy, a copper-nickel-manganese alloy or the like is bonded to a ceramic substrate by a brazing filler metal, there are some cases where reliability necessary for electronic members can not be obtained due to hardness (strength) of the brazing filler metal and due to stress produced by a difference in thermal expansion coefficient between the brazing filler metal and the ceramic substrate.

The eutectic bonding method can be only used for bonding a metal plate and a ceramic substrate which produce an eutectic melt, and often utilizes oxygen in a ceramic as a bonding material, so that it is difficult to bond a metal to a non-oxide ceramic.

The molten metal bonding method is designed to cause a molten metal to contact a ceramic substrate to bond a metal plate directly to the ceramic substrate, so that there are some cases where it is difficult to produce an electronic material having a fine shape, such as a resistor.

SUMMARY OF THE INVENTION

It is therefore an object of the present invention to eliminate the aforementioned problems and to provide a metal/ceramic bonding article capable of being produced by bonding a metal member directly to a ceramic substrate even if the metal member and the ceramic substrate produce no eutectic melt and even if any molten metals are not used, and a method for producing the same.

In order to accomplish the aforementioned and other objects, the inventors have diligently studied and found that it is possible to bond a metal member of an alloy containing copper and nickel directly to at least one surface of a ceramic substrate by heating the metal member and the ceramic member at a temperature between solidus and liquidus lines of the alloy in an atmosphere of an inert gas or in vacuo.

According to one aspect of the present invention, there is a method for producing a metal/ceramic bonding article, the method comprising the steps of: arranging a metal member of an alloy containing copper and nickel on at least one side of a ceramic substrate; and heating the metal member and the ceramic substrate at a temperature between solidus and liquidus lines of the alloy to bond the metal member directly to the ceramic substrate. The heating step may be carried out in an atmosphere of an inert gas or in vacuo.

In this method for producing a metal/ceramic bonding article, the alloy is preferably an entire-rate solid solution type alloy. The alloy may contain manganese. In this case, the alloy preferably contains 1.0 to 4.0 wt % of nickel, 10.0 to 13.0 wt % of manganese and the balance being copper and unavoidable elements.

Preferably, the temperature between solidus and liquidus lines of the alloy is not higher than a temperature which is higher than the solidus line of the alloy by 50° C. When the alloy is a manganin alloy, the temperature between solidus and liquidus lines of the alloy is preferably in the range of from 960° C. to 990° C. The inert gas is preferably nitrogen or argon gas.

A thinner plate than the metal member is preferably provided on a peripheral portion of the metal member. The thickness of the plate is preferably 0.2 mm or less. The metal member is preferably worked so as to have a predetermined shape before being arranged on the at least one side of the ceramic substrate. In addition, plating is preferably carried out on the whole or part of the surface of the metal member. Moreover, the metal/ceramic bonding article may be used as an electronic member for resistance.

When the heating step is carried out in vacuo, the method may further comprise the steps of: arranging the metal member, which is arranged on the at least one side of the ceramic substrate, on a supporting plate via a spacer; and arranging a weight thereon via a spacer, and the heating step may be carried out in a vacuum furnace.

According to another aspect of the present invention, there is provided a metal/ceramic bonding article for an electronic member, the metal/ceramic bonding article comprising: a ceramic substrate; and a metal plate of an alloy containing copper and nickel, the metal plate being bonded directly to at least one side of the ceramic substrate, wherein a heat cycle resistance is 30 cycles or more, and the metal plate has a thickness of less than 0.4 mm. In this metal/ceramic bonding article for an electronic member, the alloy may contain manganese.

According to a further aspect of the present invention, there is provided a metal/ceramic bonding article for an electronic member, the metal/ceramic bonding article comprising: a ceramic substrate; and a metal plate of an alloy containing copper and nickel, the metal plate being bonded directly to at least one side of the ceramic substrate, wherein the metal plate has a surface roughness of 10 μm or less. In this metal/ceramic bonding article for an electronic member, the alloy may contain manganese.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

In a preferred embodiment of a method for producing a metal/ceramic substrate according to the present invention, a metal member of an alloy containing copper and nickel is bonded directly to at least one surface of a ceramic substrate by heating the metal member and the ceramic substrate at a temperature between solidus and liquidus lines of the alloy in an atmosphere of an inert gas or in vacuo.

As the alloy containing copper and nickel, a manganin or constantan alloy used for detecting a current is preferably used. These alloys are preferably used as alloys for precise resistors since they are entire-rate solid solutions and since the composition thereof is selected so as to have the maximum volume resistivity and the minimum temperature coefficient of resistance.

The ceramics of the ceramic substrates include oxide ceramics, such as ceramics containing alumina or zirconia as a principal component, nitride ceramics, such as ceramics containing aluminum nitride or silicon nitride as a principal component, as non-oxide ceramics, and carbide ceramics, such as ceramics containing SiC as a principal component. In particular, the ceramics should not be limited to oxide ceramics.

The bonding of the metal member to the ceramic substrate in an atmosphere of an inert gas may be carried out in an atmosphere of nitrogen gas or argon gas. In this case, since the metal member can be bonded to the ceramic substrate in the atmosphere of the inert gas, it is possible to use a belt type tunnel furnace to continuously produce bonding articles, so that productivity is high.

Figure 4:
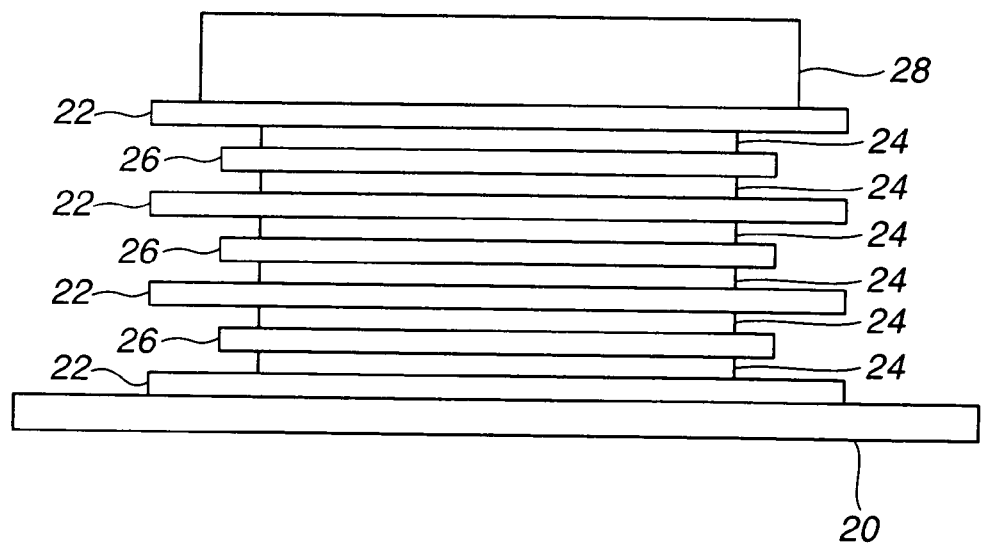
FIG. 4 is a side view showing a step of bonding metal members to both sides of a ceramic substrate in vacuo by a method for producing a metal/ceramic bonding substrate according to the present invention.

The bonding of a metal member to a ceramic substrate in vacuo may be carried out by a vacuum furnace after arranging the metal member on at least one of the ceramic substrate to arrange them on a supporting plate via a spacer to arrange a weight on the top face thereof via a spacer. For example, as shown in FIG. 4, metal members 24 can be bonded directly to both sides of each of ceramic substrates 26 after arranging metal members 24, which are arranged on both sides of each of the ceramic substrates 26, on a pallet 20 via a spacer 22 to arrange a weight 28 thereon via a spacer 22 to heat them in a vacuum furnace.

The bonding of the metal member to the ceramic substrate is carried out by heating them at a temperature between solidus and liquidus lines of the alloy. In particular, if a metal/ceramic bonding article for use in an element for precise resistor is produced, heating is preferably carried out at a temperature in the range of from the solidus line of the alloy to a higher temperature than the solidus line thereof by 50° C.

Although the mechanism of this bonding is not clear, it is considered that the surface of the ceramic substrate is wet by the occurrence of a liquidus line in a solid-liquid coexisting phase to bond the metal member to the ceramic substrate. Therefore, if the metal/ceramic bonding article is used as an electronic material, it is required to hold the shape of the surface of the metal member, and it is required to prevent a liquid phase from being excessively produced at a temperature approximating the solidus line of the alloy, so that the temperature is preferably controlled in the range of from the solidus line of the alloy to a higher temperature than the solidus line thereof by 50° C.

The bonding of the metal member to the ceramic substrate in vacuo is carried out at a high vacuum of $10^{-4}$ torr or less, and the metal member is bonded directly to a non-oxide ceramic substrate, such as an AlN substrate, so that it is considered that oxygen hardly participates in the bonding unlike the conventional eutectic bonding method. Since the bonding is carried out in vacuo, the surface of the bonded alloy plate is not oxidized, so that there is an advantage in that it is not required to carry out a subsequent step of removing an oxide film of plating. It is known that the direct bonding in an atmosphere of an inert gas using the eutectic bonding method or the like easily causes bonding failure, so-called "blister", which causes blisters on the surface of the bonded metal member. However, in the method according to the present invention for bonding the metal member to the ceramic substrate in vacuo, gas causing blisters does not exist, so that it is difficult to cause the blister failure.

In the use of a metal member of a manganin alloy being a material of an electronic member for precise resistor, the bonding temperature is preferably in the range of from 960° C. to 990° C., and more preferably in the range of from 960° C. to 980° C. For example, in the case of a manganin alloy containing 2 wt % of nickel, 12 wt % of manganese and the balance being copper and unavoidable elements, the temperature of the solidus line is about 960° C., and the temperature of the liquidus line is about 1000° C., so that it is difficult to hold a smooth surface of a metal member unless the temperature is controlled in a narrow temperature range approximating the solidus line. If the bonding is carried out at a temperature in the above described bonding temperature range, the surface roughness Rz of a manganin alloy plate is 10 μm or less to improve solder wettability, chip mounting performance and wire bonding performance at an assembly step, so that it is possible to obtain a bonding article which is preferably used as an electronic material. On other hand, if the bonding is carried out at a higher temperature than the above described bonding temperature range, there are some cases where characteristics, such as solder wettability, may be deteriorated.

If a metal member of a manganin alloy is bonded to a ceramic substrate, the thickness of the metal member is preferably less than 0.4 mm, and more preferably 0.2 mm or less. Because the ceramic substrate may be broken due to stress caused by a difference in thermal expansion coefficient between the metal member and the ceramic substrate if the thickness of the metal member is 0.4 mm or more. In order to reduce the thermal stress, the metal member bonded to the ceramic substrate without the need of any brazing filler metal is preferably slow-cooled.

If the thickness of a metal member of a manganin alloy is 0.4 mm or more, a thin plate portion is preferably provided at the end portion of the metal member, and the thickness of the thin plate portion is preferably 0.2 mm or less. Because the alloy, such as a manganin alloy, has a higher 0.2% proof stress than pure metal, such as copper, and a high residual stress applied to a ceramic substrate, so that it is required to sufficiently consider reliability to relax stress by the thin plate portion.

As evaluation of the reliability of an electronic material, a heat cycle resistance is known. For example, it is required to produce no cracks in the ceramic substrate and it is required to prevent electric characteristics from being deteriorated, even if a heat cycle (room temperature→−40° C.×30 minutes→room temperature×10 minutes→125° C.×30 minutes→room temperature×10 minutes) is carried out thirty times. If the thickness of the metal member is less than 0.4 mm, conditions on these characteristics are satisfied.

Since it is not required to carry out a subsequent working if the metal member is previously worked so as to have a predetermined shape, the metal member is preferably bonded to the ceramic substrate after the metal member is worked by press working or etching so as to have a predetermined shape. Moreover, in order to facilitate soldering and in order to prevent the metal member from deteriorating with age, the whole or part of the surface of the metal member is preferably plated with nickel or nickel alloy. This plating may be carried out by the electrolytic plating or electroless plating.

To the surface and reverse of the ceramic substrate, different kinds of metal members may be bonded. For example, after a copper member is previously bonded to one side of the ceramic substrate by the direct bonding method, a member of a Cu—Ni—Mn alloy may be bonded to the other side thereof. In this case, the copper member may be used as a heat sink plate.

Examples of metal/ceramic bonding articles and methods for producing the same according to the present invention will be described below in detail.

EXAMPLE 1

Figure 1:
FIG. 1 is a side view showing a step of bonding a metal member to the top face of a ceramic substrate in an atmosphere of an inert gas in Example 1 by a method for producing a metal/ceramic bonding substrate according to the present invention.

As shown in FIG. 1, a ceramic substrate 12 of 96% alumina having a size of 45 mm×67 mm×0.635 mm was arrange on a floor plate 10 of alumina, and a manganin plate 14 of 2Ni-12Mn—Cu alloy having a size of 40 mm×50 mm×0.2 mm was arranged on the top of the ceramic substrate 12. Then, they were arranged in a belt type tunnel furnace, through which nitrogen gas passed, to be heated at a maximum temperature of 975° C. for ten minutes. Thereafter, they were cooled to obtain a metal/ceramic bonding article. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 2

Figure 2:
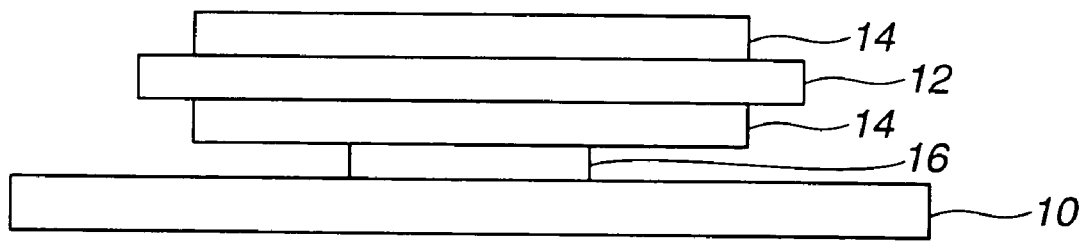
FIG. 2 is a side view showing a step of bonding metal members to both sides of a ceramic substrate in an atmosphere of an inert gas in Example 2 by a method for producing a metal/ceramic bonding substrate according to the present invention.

A metal/ceramic bonding article was obtained by the same method as that in Example 1, except that manganin plates 14 arranged on both sides of a ceramic substrate 12 were arranged on a floor plate 10 via a spacer 16 as shown in FIG. 2. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 3

Figure 3:
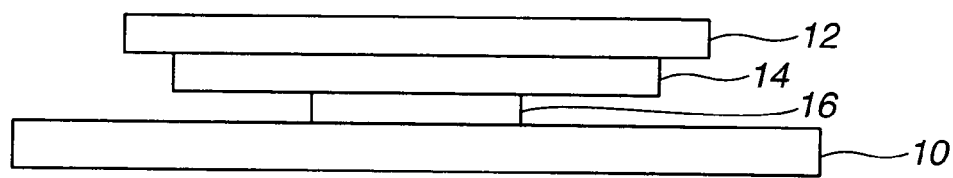
FIG. 3 is a side view showing a step of bonding a metal member to the bottom face of a ceramic substrate in an atmosphere of an inert gas in Example 3 by a method for producing a metal/ceramic bonding substrate according to the present invention.

A metal/ceramic bonding article was obtained by the same method as that in Example 1, except that a manganin plate 14 arranged on the bottom face of a ceramic substrate 12 was arranged on a floor plate 10 via a spacer 16 as shown in FIG. 3. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 4

A metal/ceramic bonding article was obtained by the same method as that in Example 1, except that the size of the manganin plate 14 was 20 mm×30 mm×0.2 mm. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor. Moreover, after a heat cycle (room temperature→−40° C.×30 minutes→room temperature×10 minutes→125° C.×30 minutes→room temperature×10 minutes) was carried out thirty times, no cracks were produced in the ceramic substrate, and electric characteristics were not deteriorated.

EXAMPLE 5

A metal/ceramic bonding article was obtained by the same method as that in Example 1, except that the size of the manganin plate 14 was 20 mm×30 mm×0.1 mm. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor. Moreover, after the same heat cycle as that in Example 4 was carried out thirty times, no cracks were produced in the ceramic substrate, and electric characteristics were not deteriorated.

EXAMPLE 6

A metal/ceramic bonding article was obtained by the same method as that in Example 1, except that the size of the manganin plate 14 was 20 mm×30 mm×0.05 mm. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor. Moreover, after the same heat cycle as that in Example 4 was carried out thirty times, no cracks were produced in the ceramic substrate, and electric characteristics were not deteriorated.

EXAMPLE 7

A metal/ceramic bonding article was obtained by the same method as that in Example 4, except that a zirconia containing alumina substrate having a size of 45 mm×67 mm×0.25 mm was used as the ceramic substrate. The peel strength of the metal/ceramic bonding article thus obtained was measured. As a result, the peel strength was 5 kg/cm or more, so that it was found that it was possible to obtain a sufficiently strong bonding for an electronic member. In addition, the manganin plate was not deteriorated, so that it was possible to produce an electronic part usable as a precise resistor.

EXAMPLE 8

A metal/ceramic bonding article was obtained by the same method as that in Example 5, except that a zirconia containing alumina substrate having a size of 45 mm×67 mm×0.25 mm was used as the ceramic substrate. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 9

A metal/ceramic bonding article was obtained by the same method as that in Example 6, except that a zirconia containing alumina substrate having a size of 45 mm×67 mm×0.25 mm was used as the ceramic substrate. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 10

A metal/ceramic bonding article was obtained by the same method as that in Example 1, except that a manganin plate having a thickness of 0.2 mm was arranged on an alumina substrate after the manganin plate was worked by etching so as to have a predetermined shape for a shunt resistor and that the maximum temperature was 980° C. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 11

A metal/ceramic bonding article was obtained by the same method as that in Example 1, except that a manganin plate having a thickness of 0.2 mm was arranged on a zirconia containing alumina substrate after the manganin plate was worked by etching so as to have a predetermined shape for a shunt resistor and that the maximum temperature was 980° C. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

EXAMPLE 12

A metal/ceramic bonding article was obtained by the same method as that in Example 1, except that a manganin plate having a size of 20 mm×30 mm×0.4 mm was arranged on an alumina substrate after the manganin plate was worked by etching so that a portion of 1 mm from the outer periphery has a thickness of 0.2 mm, and that the maximum temperature was 980° C. The peel strength of the metal/ceramic bonding article thus obtained was measured. As a result, the peel strength was 5 kg/cm or more, so that it was found that it was possible to obtain sufficiently strong bonding for an electronic member. The manganin plate was not deteriorated, so that it was possible to produce an electronic part usable as a precise resistor.

COMPARATIVE EXAMPLE 1

A metal/ceramic bonding article was obtained by the same method as that in Example 5, except that a silver braze containing titanium as an active metal was arranged between a manganin plate and an alumina substrate and that bonding was carried out at a temperature of 850° C. in vacuo. The peel strength of the metal/ceramic bonding article thus obtained was measured. As a result, the peel strength was 5 kg/cm or more, so that it was found that it was possible to obtain sufficiently strong bonding for an electronic member. However, the components of the brazing filler metal were dispersed in the manganin plate to deteriorate the manganin plate, so that it was not possible to use the bonding article as a resistor.

EXAMPLE 13

Manganin plates of 2Ni-12Mn—Cu alloy having a size of 20 mm×30 mm×0.2 mm arranged on both sides of each of ceramic substrates of 96% alumina having a size of 45 mm×67 mm×0.635 mm were stacked via a spacer of AlN, Then, they were heated in a vacuum furnace at a maximum temperature of 975° C. for thirty minutes. Thereafter, they were cooled to obtain a metal/ceramic bonding article. Furthermore, BN powder was applied on the spacer as a mold releasing agent.

The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 14

A metal/ceramic bonding article was obtained by the same method as that in Example 13, except that the size of the manganin plates was 20 mm×30 mm×0.1 mm. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated. The surface roughness Rz of the bonded manganin plates was measured. As a result, the surface roughness Rz was 6.9 μm. The Ni—P electroless plating was carried out on the surface of the metal/ceramic bonding article to evaluate solder wettability and wire bonding performance. As a result, there was no problem if it was used as an electronic part. Moreover, no blister failure was caused.

EXAMPLE 15

A metal/ceramic bonding article was obtained by the same method as that in Example 13, except that the size of the manganin plates was 20 mm×30 mm×0.05 mm. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 16

A metal/ceramic bonding article was obtained by the same method as that in Example 13, except that aluminum nitride substrates were used as the ceramic substrates. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 17

A metal/ceramic bonding article was obtained by the same method as that in Example 14, except that aluminum nitride substrates were used as the ceramic substrates. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 18

A metal/ceramic bonding article was obtained by the same method as that in Example 15, except that aluminum nitride substrates were used as the ceramic substrates. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 19

A metal/ceramic bonding article was obtained by the same method as that in Example 13, except that zirconia containing substrates were used as the ceramic substrates. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 20

A metal/ceramic bonding article was obtained by the same method as that in Example 13, except that manganin plates having a thickness of 0.2 mm were arranged on both sides of each of alumina substrates after the manganin plates were worked by etching so as to have a predetermined shape for a shunt resistor and that heating was carried out at a maximum temperature of 980° C. for ten minutes. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 21

A metal/ceramic bonding article was obtained by the same method as that in Example 13, except that manganin plates having a thickness of 0.2 mm were arranged on both sides of each of AlN substrates after the manganin plates were worked by etching so as to have a predetermined shape for a shunt resistor and that heating was carried out at a maximum temperature of 980° C. for ten minutes. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

EXAMPLE 22

A metal/ceramic bonding article was obtained by the same method as that in Example 13, except that manganin plates having a size of 20 mm×30 mm×0.4 mm were arranged on both sides of each of alumina substrates after the manganin plates were worked by etching so that a portion of 1 mm from the outer periphery has a thickness of 0.2 mm, and that heating was carried out at a maximum temperature of 980° C. for ten minutes. The peel strength of the metal/ceramic bonding article thus obtained was measured. As a result, the peel strength was 3 kg/cm or more, so that it was found that it was possible to obtain sufficiently strong bonding for an electronic member. The manganin plates were not deteriorated, so that it was possible to produce an electronic part usable as a precise resistor. Moreover, no blister failure was caused.

COMPARATIVE EXAMPLE 2

A metal/ceramic bonding article was obtained by the same method as that in Example 17, except that a silver braze containing titanium as an active metal was arranged between a manganin plate and an alumina substrate and that bonding was carried out at a temperature of 850° C. in vacuo. The peel strength of the metal/ceramic bonding article thus obtained was measured. As a result, the peel strength was 5 kg/cm or more, so that it was found that it was possible to obtain sufficiently strong bonding for an electronic member. However, the components of the brazing filler metal were dispersed in the manganin plates to deteriorate the manganin plates, so that it was not possible to use the bonding article as a resistor.

As described above, according to the present invention, it is possible to bond a metal member directly to a ceramic substrate even if the metal member and the ceramic substrate do not produce an eutectic melt and even if any molten metals are not used. When the metal member is bonded to the ceramic substrate in vacuo, it is possible to prevent the occurrence of blister failure.

The bonding of a metal/ceramic bonding article produced by a method according to the present invention is sufficiently strong for an electronic member. In addition, the resistance characteristics of the bonding article are maintained as those of the alloy, and the reliability of the bonding article is sufficient. Therefore, the bonding article can be used for a shunt resistor utilized for measuring a current in a circuit of a generalized inverter, a current detecting element in a hybrid integrated circuit, and a temperature compensating circuit, such as a strain gage type converter.

When the metal member is bonded to the ceramic substrate in an atmosphere of an inert gas, the bonding article can be continuously produced by a tunnel furnace to enhance the production efficiency. When the metal member is bonded to the ceramic substrate in vacuo, an electronic part having characteristics, such as solder wettability and wire bonding performance, which are required at an assembly step, can be produced since the surface roughness Rz of the bonded metal member is 10 μm or less.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for producing a metal/ceramic bonding article, said method comprising the steps of:
    arranging a metal member of an alloy containing copper and nickel on at least one side of a ceramic substrate;
    arranging said metal member, which is arranged on said at least one side of said ceramic substrate, on a supporting plate via a spacer;
    arranging a weight thereon via a spacer; and
    heating said metal member and said ceramic substrate in vacuo at a temperature between solidus and liquidus lines of said alloy to bond said metal member directly to said ceramic substrate,
    wherein said heating step is carried out in a vacuum furnace.

2. A method for producing a metal/ceramic bonding article as set forth in claim 1, wherein said alloy is an entire-rate solid solution type alloy.

3. A method for producing a metal/ceramic bonding article as set forth in claim 1, wherein said alloy contains manganese.

4. A method for producing a metal/ceramic bonding article as set forth in claim 3, wherein said alloy contains 1.0 to 4.0 wt% of nickel, 10.0 to 13.0 wt% of manganese and the balance being copper and unavoidable elements.

5. A method for producing a metal/ceramic bonding article as set forth in claim 1, wherein said temperature between solidus and liquidus lines of said alloy is not higher than a temperature which is higher than said solidus line of said alloy by 50° C.

6. A method for producing a metal/ceramic bonding article as set forth in claim 1, wherein said alloy is a manganin alloy, and said temperature between solidus and liquidus lines of said alloy is in the range of from 960° C. to 990° C.

7. A method for producing a metal/ceramic bonding article as set forth in claim 1, wherein a thinner plate than said metal member is provided on a peripheral portion of said metal member.

8. A method for producing a metal/ceramic bonding article as set forth in claim 7, wherein said plate has a thickness of 0.2 mm or less.

9. A method for producing a metal/ceramic bonding article as set forth in claim 1, wherein plating is carried out on the whole or part of a surface of said metal member.

10. A method for producing a metal/ceramic bonding article as set forth in claim 1, wherein said metal/ceramic bonding article is an electronic member for resistance.

* * * * *